United States Patent
Wang et al.

(10) Patent No.: US 10,874,885 B2
(45) Date of Patent: Dec. 29, 2020

(54) FALL PROTECTION DEVICE

(71) Applicant: YOKE INDUSTRIAL CORP., Taichung (TW)

(72) Inventors: Jyu-Yi Wang, Changhua (TW);
Wen-Ming Liao, Taichung (TW);
Wei-Chieh Hung, Taichung (TW)

(73) Assignee: YOKE INDUSTRIAL CORP., Taichung (TW)

( * ) Notice: Subject to any disclaimer, the term of this patent is extended or adjusted under 35 U.S.C. 154(b) by 61 days.

(21) Appl. No.: 16/192,252

(22) Filed: Nov. 15, 2018

(65) Prior Publication Data
US 2020/0078617 A1    Mar. 12, 2020

(30) Foreign Application Priority Data
Sep. 11, 2018 (TW) ................. 107131927 A

(51) Int. Cl.
*A62B 35/00* (2006.01)
*A62B 1/10* (2006.01)
(Continued)

(52) U.S. Cl.
CPC ............ *A62B 35/0093* (2013.01); *A62B 1/10* (2013.01); *F16D 59/00* (2013.01); *E04G 21/3204* (2013.01)

(58) Field of Classification Search
CPC ......... A62B 1/08; A62B 1/10; A62B 35/0093; F16D 59/00
See application file for complete search history.

(56) References Cited

U.S. PATENT DOCUMENTS 7,780,146 B2 * 8/2010 Casebolt ............... A62B 1/10
  254/346
8,181,744 B2 * 5/2012 Parker .................... A62B 1/10
  182/232
(Continued)

FOREIGN PATENT DOCUMENTS

| TW | M537492 U | 3/2017 |
|----|-----------|--------|
| TW | M555231 U | 2/2018 |
| TW | M572768 U | 1/2019 |

OTHER PUBLICATIONS

Examination Report for TW107131927, dated Jun. 20, 2019, Total of 5 pages.
(Continued)

*Primary Examiner* — Colleen M Chavchavadze
(74) *Attorney, Agent, or Firm* — Tracy M Heims; Apex Juris, pllc.

(57) ABSTRACT

A fall protection device includes a frame, a rotatable member being pivotally connected to the frame, a safety belt winding around the rotatable member, a braking plate, and a plurality of braking parts. A side surface of the frame has a connecting hole located on a center of the frame and a plurality of stoppers. The braking plate has a driven shaft passing through the connecting hole to be coaxially connected to the rotatable member. A number of the braking parts is the same as a number of the stoppers. The braking parts are pivotally connected to an inner surface of a plate body of the braking plate. When the braking parts are located at a locking position, an abutting portion of each of the braking parts is located at a position corresponding to one of the stoppers and abuts against one of the stoppers at the same time.

9 Claims, 6 Drawing Sheets

(51) Int. Cl.
*F16D 59/00* (2006.01)
*E04G 21/32* (2006.01)

(56) References Cited

U.S. PATENT DOCUMENTS

| | | | | |
|---|---|---|---|---|
| 8,490,750 | B2* | 7/2013 | Balquist | A62B 35/0093 |
| | | | | 182/231 |
| 9,121,462 | B2* | 9/2015 | Casebolt | A62B 1/10 |
| 9,199,103 | B2* | 12/2015 | Hetrich | A62B 1/10 |
| 9,861,841 | B1* | 1/2018 | Hung | A62B 35/0093 |
| 10,391,339 | B2* | 8/2019 | Sun | A62B 35/0093 |
| 10,478,646 | B2* | 11/2019 | Sun | A62B 35/0093 |
| 2013/0105247 | A1* | 5/2013 | Casebolt | A62B 1/10 |
| | | | | 182/241 |
| 2018/0289987 | A1* | 10/2018 | Hung | A62B 1/14 |
| 2018/0333598 | A1* | 11/2018 | Hung | A62B 35/0075 |
| 2019/0030381 | A1* | 1/2019 | Hung | A62B 35/0037 |

OTHER PUBLICATIONS

Search Report for TW107131927, dated Jun. 20, 2019, Total of 1 page.
English Abstract for TWM537492, Total of 1 page.
English Abstract for TWM555231, Total of 1 page.
English Abstract for TWM572768, Total of 1 page.

\* cited by examiner

FALL PROTECTION DEVICE

BACKGROUND OF THE INVENTION

Technical Field

The present invention relates generally to a fall protection device, and more particularly to a fall protection device suitable for a hanging work site.

Description of Related Art

Fall protection devices are usually used in a person working in elevated workplaces to provide a braking effect when the person falls, preventing the person from continuing fall and ensuring the safety of the person.

A conventional fall protection device is mainly composed of a fixed body, a rotating body rotatably disposed on the fixed body, a belt body connected to the rotating body, a plurality of braking parts pivotally disposed on the rotating body, and a plurality of stoppers connected to the fixed body. While using the conventional fall protection device, the fixed body is adapted to be connected to an external support, and the belt body is adapted to be fastened on the person working in elevated workplaces. When the person carelessly falls from an elevated site, the belt body will be pulled by the person to rotate the rotating body rapidly, so that the braking parts are spun out to bump and abut against the stoppers by a centrifugal force. With the blocking of the stoppers, the rotating body cannot rotate, thereby preventing the belt body being continuously pulled out and preventing the person from continuously falling.

However, in the conventional fall protection device, the number of the stoppers is not the same as the number of the braking parts. In addition, distances and angles between each of the stoppers and distances and angles between each of the braking parts are not the same either. As a result, when the person carelessly falls from an elevated site, only one of the braking parts can be in contact with the corresponding stopper, while other braking parts will not abut against the stoppers to provide a locking effect, so that the force exerted by the conventional fall protection device only concentrate on a single stopper. In consequence, the force that the single stopper or the single braking part bears is too large, which is easy to cause damage or even breakage, so that the conventional fall protection device loses the emergency locking effect, and cannot ensure the safety of the person.

BRIEF SUMMARY OF THE INVENTION

In view of the above, the primary objective of the present invention is to provide a fall protection device, which could evenly distribute a force by making a locking effect between all of the braking parts and all of the stoppers at the same time.

In addition, the another primary objective of the present invention is to provide a fall protection device, which could avoid damage and extend a service life.

The present invention provides a fall protection device, which includes a frame, a rotatable member, a safety belt, a braking plate, and a plurality of braking parts, wherein a side surface of the frame has a connecting hole located on a center of the frame and a plurality of stoppers which protrude and are located around a periphery of the connecting hole. Distances between each stopper and a center of the connecting hole are the same. The stoppers are centered on the center of the connecting hole; central angles between any two adjacent stoppers are the same. The rotatable member is rotatably and pivotally disposed on the frame. The safety belt winds around an outer peripheral surface of the rotatable member and pulls the rotatable member to rotate. The braking plate has a plate body and a driven shaft protruding from a center of the plate body, wherein the driven shaft passes through the connecting hole of the frame, so that the braking plate is coaxially connected to the rotatable member, whereby the braking plate rotates coaxially along with the rotatable member. A number of the braking parts is the same as a number of the stoppers. Each of the braking parts has a body and an abutting portion which is integrally connected to the body as a monolithic unit. The body of each of the braking parts is pivotally connected to the plate body of the braking plate, so that the braking parts are located around a periphery of the driven shaft, wherein when the braking plate rotates, each of the braking parts is driven to pivot from a restoring position to a locking position. When each of the braking parts is located at the locking position, the abutting portion of each of the braking parts is located at a position corresponding to one of the stoppers and abuts against one of the stoppers at the same time, thereby to restrict the rotatable member from rotating.

By limiting the number of the plurality of the braking parts the same as the number of the plurality of stoppers, the abutting portion of each of the braking parts is located at the position corresponding to one of the stoppers, so that each of the braking parts could lock and abut against the corresponding stopper synchronously, thereby to evenly distribute the withstanding force on each of the stoppers, reducing the chance of damage, extending the service lift, and further enhancing the accuracy and maximum load capacity during locking.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
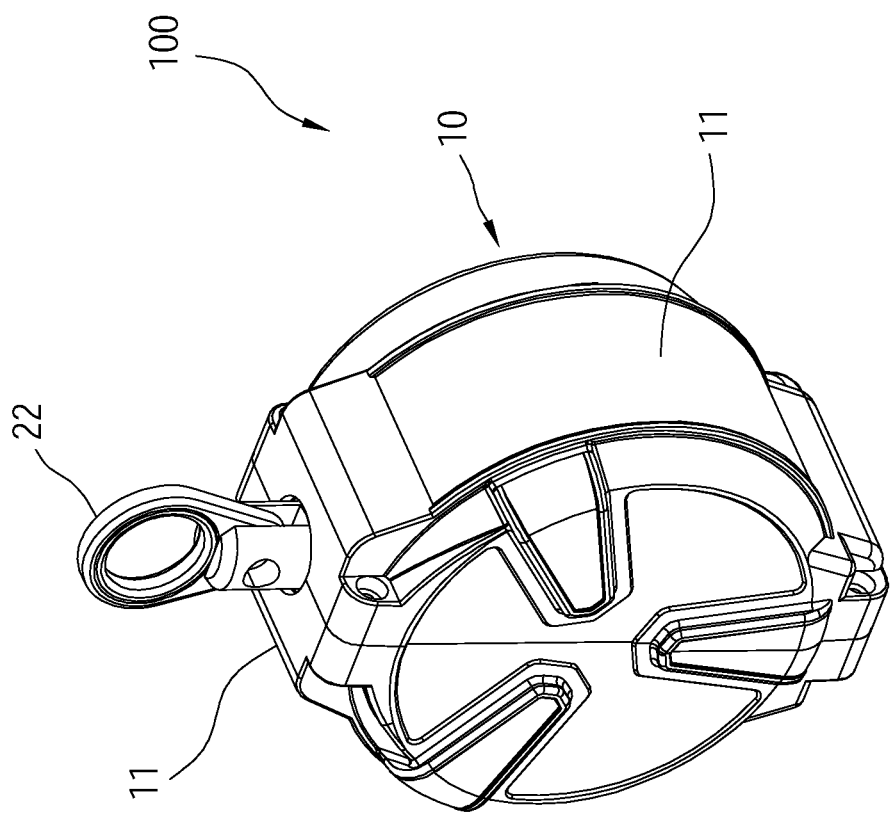
FIG. 1 is a perspective view of the fall protection device of an embodiment according to the present invention.

A fall protection device 100 is illustrated in FIG. 1 to FIG. 5 and includes a housing 10, a frame 20, a rotatable member 30, a safety belt 40, a winding device 50, a braking plate 60, a plurality of braking parts 70, and a plurality of restoring springs 80.

Figure 2A:
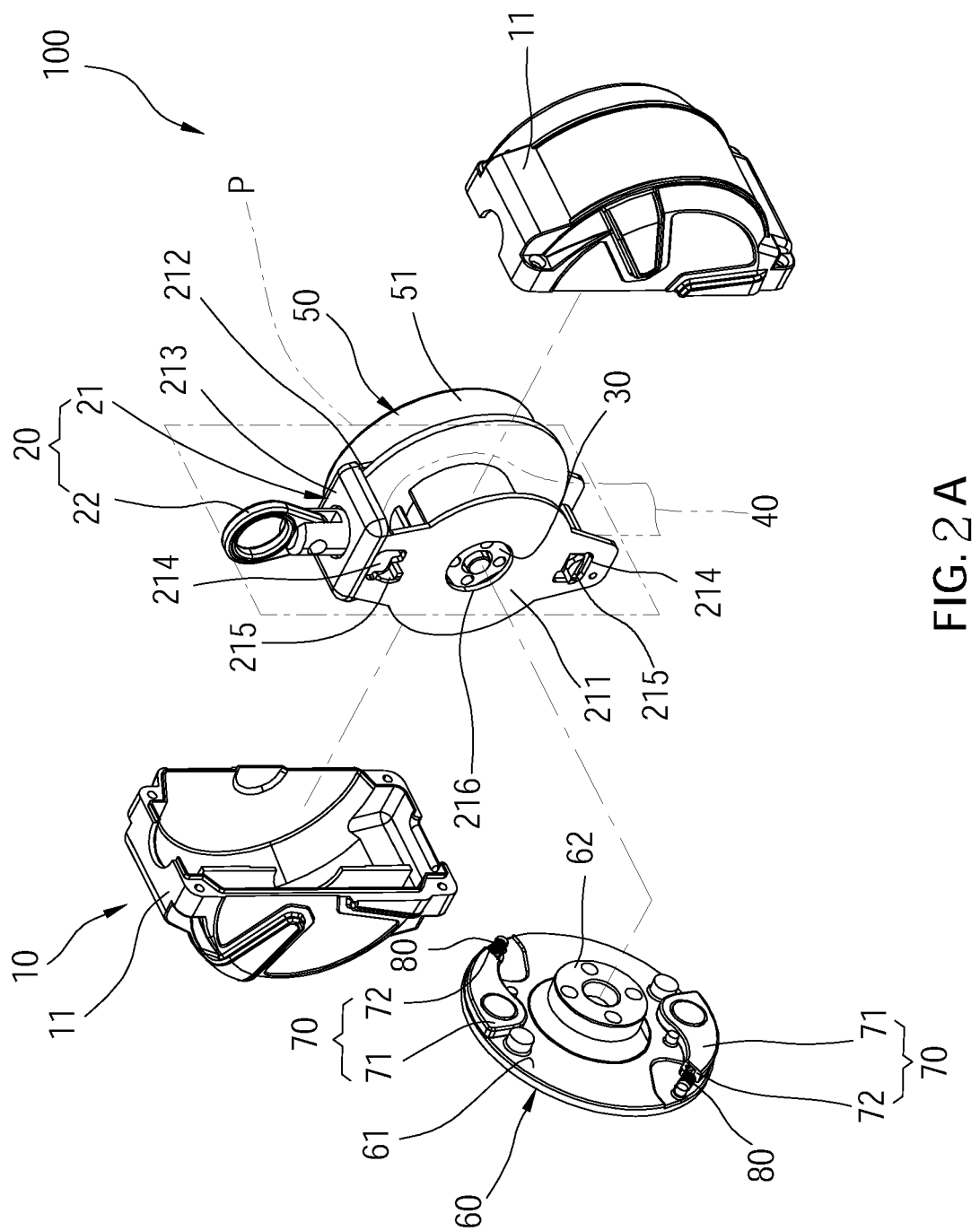
FIG. 2A is an exploded perspective view of FIG. 1.
Figure 2B:
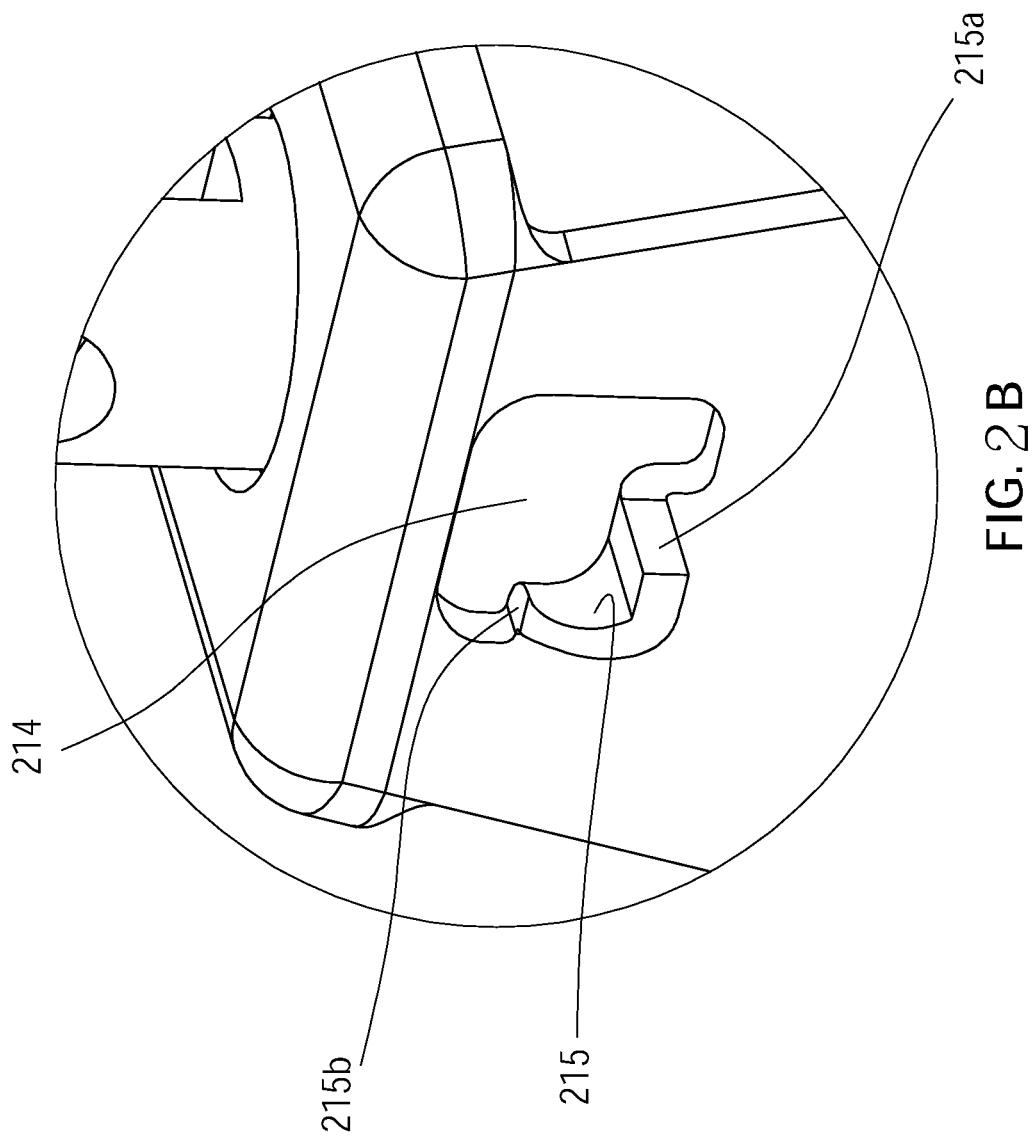
FIG. 2B is a partially enlarged view of FIG. 2A.
Figure 3:
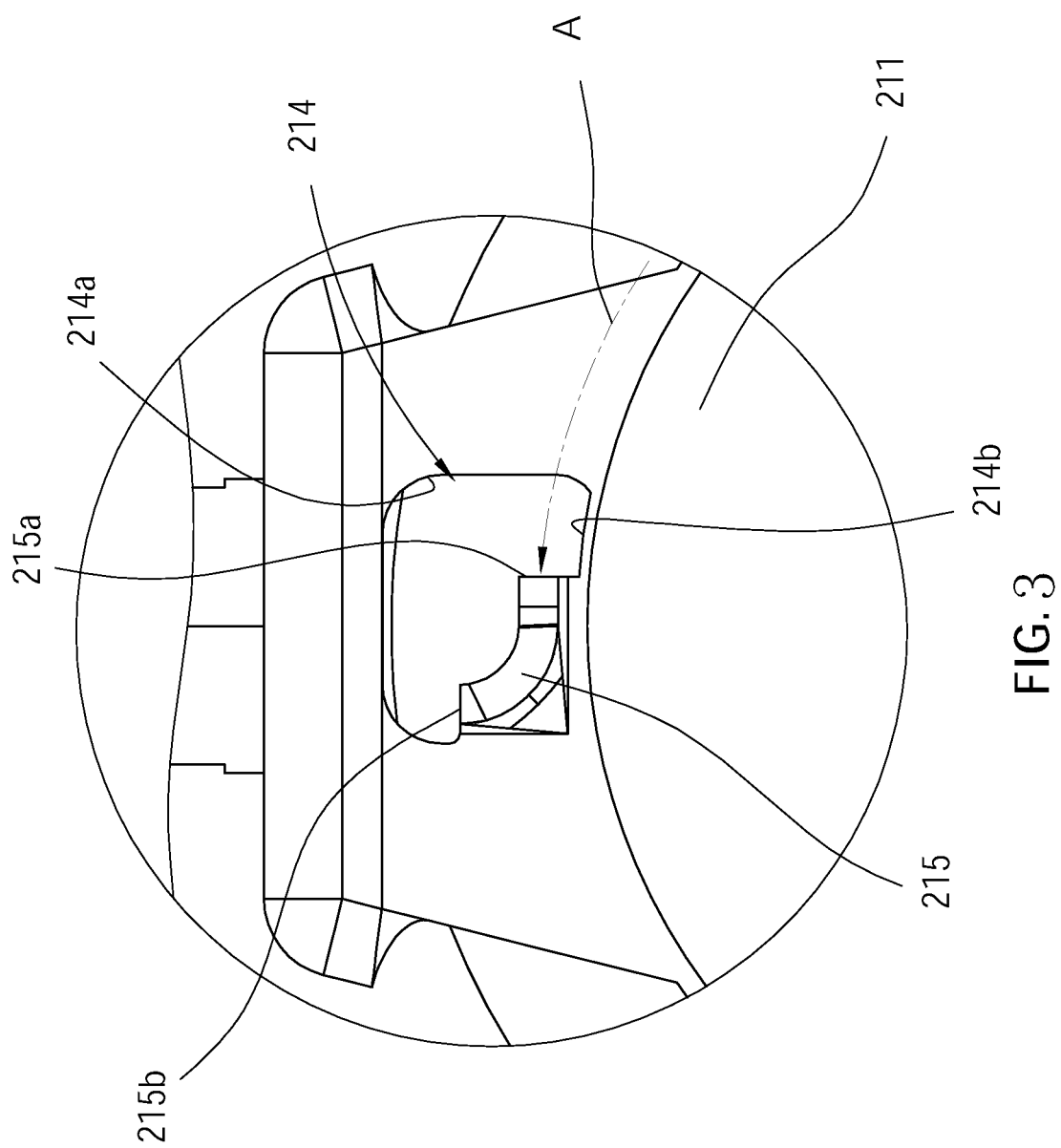
FIG. 3 is a partially enlarged view, showing partial components of FIG. 1.

As shown in FIG. 1 to FIG. 3, two casings 11 are engaged with each other to constitute the housing 10.

The frame 20 has a frame body 21 and a hanging ring 22. The frame body 21 has a first side plate 211, a second side plate 212, and a top plate 213, wherein the first side plate 211 is parallel to the second side plate 212 and is spaced from the second side plate 212 by a predetermined distance, and the top plate 213 is connected to both of a top end of the first side plate 211 and a top end of the second side plate 212. A plurality of holes 214, which are hollow, are formed on an outer surface of the first side plate 211 (i.e., a lateral side of the frame 20). A stopper 215 extends outward relative to the outer surface of the first side plate 211 from two adjacent side walls of each of the holes 214. In the current embodiment, each of the stoppers 215 is curved and extends in an arc-shape, wherein each of the stoppers 215 is integrally connected to the two adjacent side walls of one of the holes 214 as a monolithic unit.

Figure 4:
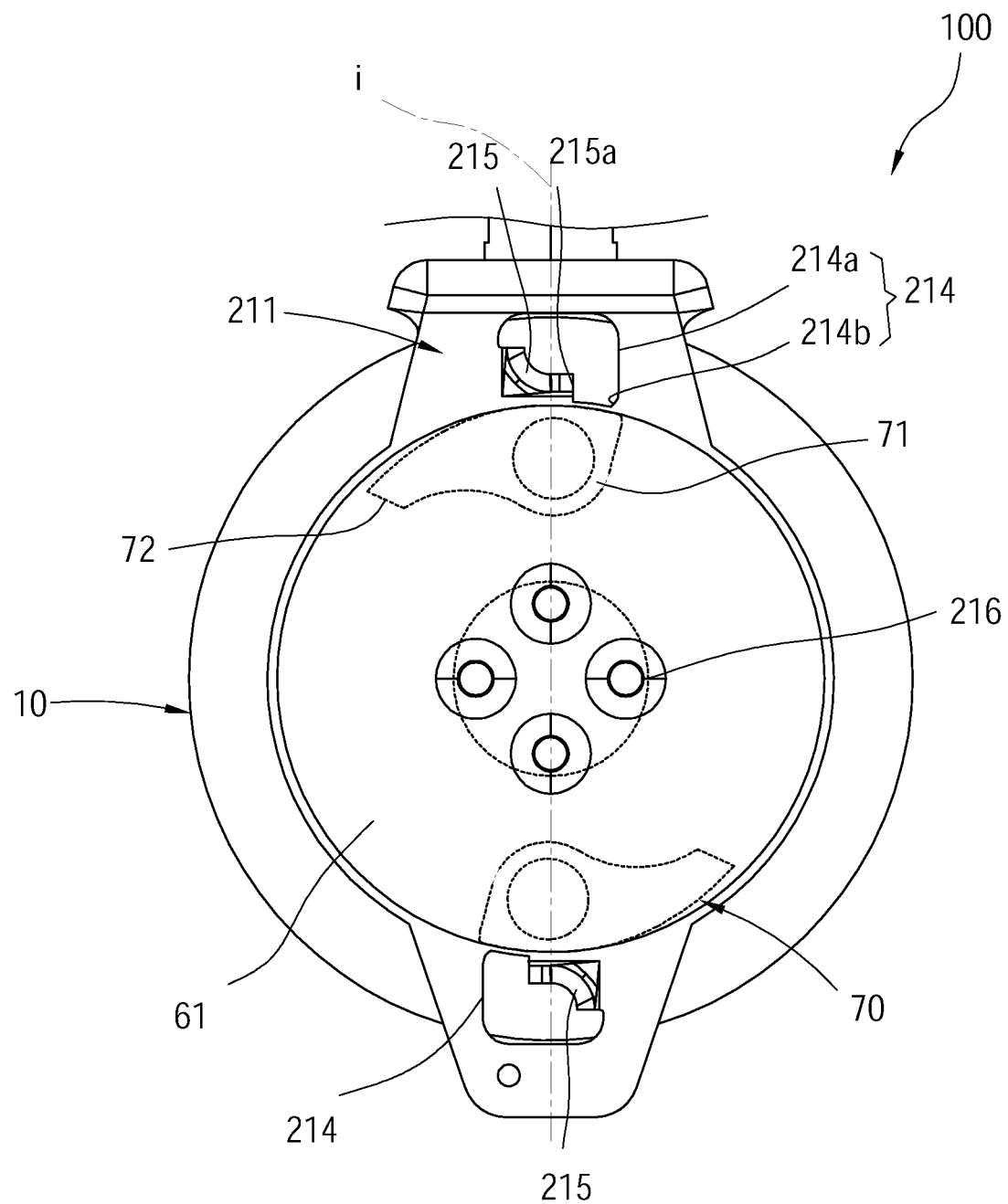
FIG. 4 is a schematic view, showing the braking parts are located at the restoring position.

The first side plate 211 has a connecting hole 216 passing through a center thereof. The stoppers 215 are disposed around a periphery of the connecting hole 216, wherein distances between each stopper 215 and a center of the connecting hole 216 are the same. The stoppers 215 are centered on the center of the connecting hole 216, and central angles between any two adjacent stoppers 215 are the same. In the current embodiment, the frame 20 includes two stoppers 215 which are disposed on the same virtual extension axis i passing through the center of the connecting hole 216, as shown in FIG. 4, wherein the central angle between the two stoppers 215 is 180 degrees. The hanging ring 22 is rotatably engaged with the top plate 213 of the frame body 21. The two stoppers 215 are located on the same virtual extension surface P passing through the center of the connection hole 216 and a rotation axis of the hanging ring 22, as shown in FIG. 2, wherein the virtual extension axis i is located on the virtual extension surface P. The frame body 21 is fixed on an inside of the housing 10. The hanging ring 22 extends out of the housing 10 from a top of the housing 10.

In the current embodiment, each of the holes 214 includes a first portion 214a and a second portion 214b, wherein the first portion 214a communicates with the second portion 214b. Each of the stoppers 215 is connected to two side walls of the first portion 214a of the corresponding hole 214. Each of the second portions 214b is closer to the connecting hole 216 than the corresponding first portion 214a.

More specifically, as shown in FIG. 2B and FIG. 3, the two stoppers 215 have the same structure, wherein each of the stoppers 215 has a first side end 215a and a second side end 215b. Each of the stoppers 215 extends in an arc shape from the first side end 215a toward the second side end 215b thereof. A height of each of the stoppers 215 relative to the outer surface of the first side plate 211 decreases gradually from the first side end 215a to the second side end 215b. In the current embodiment, each of the stoppers 215 extends away from the braking plate in an arc-shape. In other words, a bending direction that each of the stoppers 215 bends between the first side end 215a and the second side end 215b thereof is opposite to an arc direction A, wherein the arc direction A is centered on the connecting hole 216, and the first side end 215a of each of the stoppers 215 is located on the arc direction A. Each of the second side ends 215b and the corresponding first side end 215a face in different directions, wherein the second side end 215b of one of the stoppers 215 (i.e., the upper stopper 215 shown in FIG. 4) faces the top plate 213, and the second side end 215b of the other stopper 215 (i.e., the lower stopper 215 shown in FIG. 4) faces a direction away from the top plate 213.

As shown in FIG. 1 to FIG. 3, the rotatable member 30 is rotatably and pivotally disposed between the first side plate 211 and the second side plate 212 of the frame 20.

As shown in FIG. 1 to FIG. 3, the safety belt 40 winds around an outer peripheral surface of the rotatable member 30. An end of the safety belt 40 is fixed on the rotatable member 30, while another end thereof extends out of the housing 10 via a bottom of the housing 10, so that the safety belt 40 pulls the rotatable member 30 to rotate.

As shown in FIG. 1 to FIG. 3, the winding device 50 includes a boxing 51 and a spiral spring (not shown), wherein the boxing 51 is connected to an outer surface of the second side plate 212 of the frame 20 and is located inside of the housing 10. The spiral spring is disposed inside of the boxing 51, wherein an inner end of the spiral spring is connected to the rotatable member 30, and an outer end of the spiral spring is connected to the boxing 51, so that a rewinding force exerted on the rotatable member 30 is provided by the spiral spring of the winding device 50 to rewind the safety belt 40.

As shown in FIG. 1 to FIG. 3, the braking plate 60 has a plate body 61 and a driven shaft 62 protruding from a center of an inner surface of the plate body 61. The braking plate 60 is disposed inside of the housing 10 with the driven shaft 62 passing through the connecting hole 216 of the frame 20, so that the braking plate 60 is coaxially connected to the rotatable member 30, whereby the braking plate 60 rotates coaxially along with the rotatable member 30.

As shown in FIG. 1 to FIG. 3, a number of the braking parts 70 is the same as a number of the stoppers 215. Each of the braking parts 70 has a body 71 and an abutting portion 72 connected to the body 71, wherein the body 71 is pivotally connected to the inner surface of the plate body 61 of the braking plate 60, and faces the outer surface of the first side plate 211 of the frame 20. The abutting portion 72 is located on an outer end of the body 71. Each of the braking parts 70 could pivot between a restoring position (as shown in FIG. 4) and a locking position (shown in FIG. 5). When each of the braking parts 70 is located at the locking position, each of the braking parts 70 is located at a position corresponding to the corresponding stopper 215 (i.e., the distances between the abutting portion 72 of each braking part 70 and an axial center of the driven shaft 62 of the braking plate 60 are the same as the distances between each stopper 215 and the center of the connecting hole 216). Central angles between the abutting portion 72 of any two adjacent braking parts 70 are also the same as the central angles between any two adjacent stoppers 215. In the current embodiment, a line of the abutting portion 72 of the two braking parts 70 passes through the axial center of the driven shaft 62, and the central angle between the abutting portions 72 is also 180 degrees. When the braking parts 70 are pivoted and deployed to the locking position, each of the abutting portions 72 abuts against the first side end 215a of one of the stoppers 215 in the arc direction A.

As shown in FIG. 2A, each of the restoring springs 80 is connected between a side of the abutting portion 72 of one of the braking parts 70 and the plate body 61 of the braking plate 60 to provide an elastic force for moving the braking parts 70 back to the restoring position. In this way, in a condition without being subjected to an external force, the elastic force could urge the braking parts 70 to normally stay at the restoring position.

Figure 5:
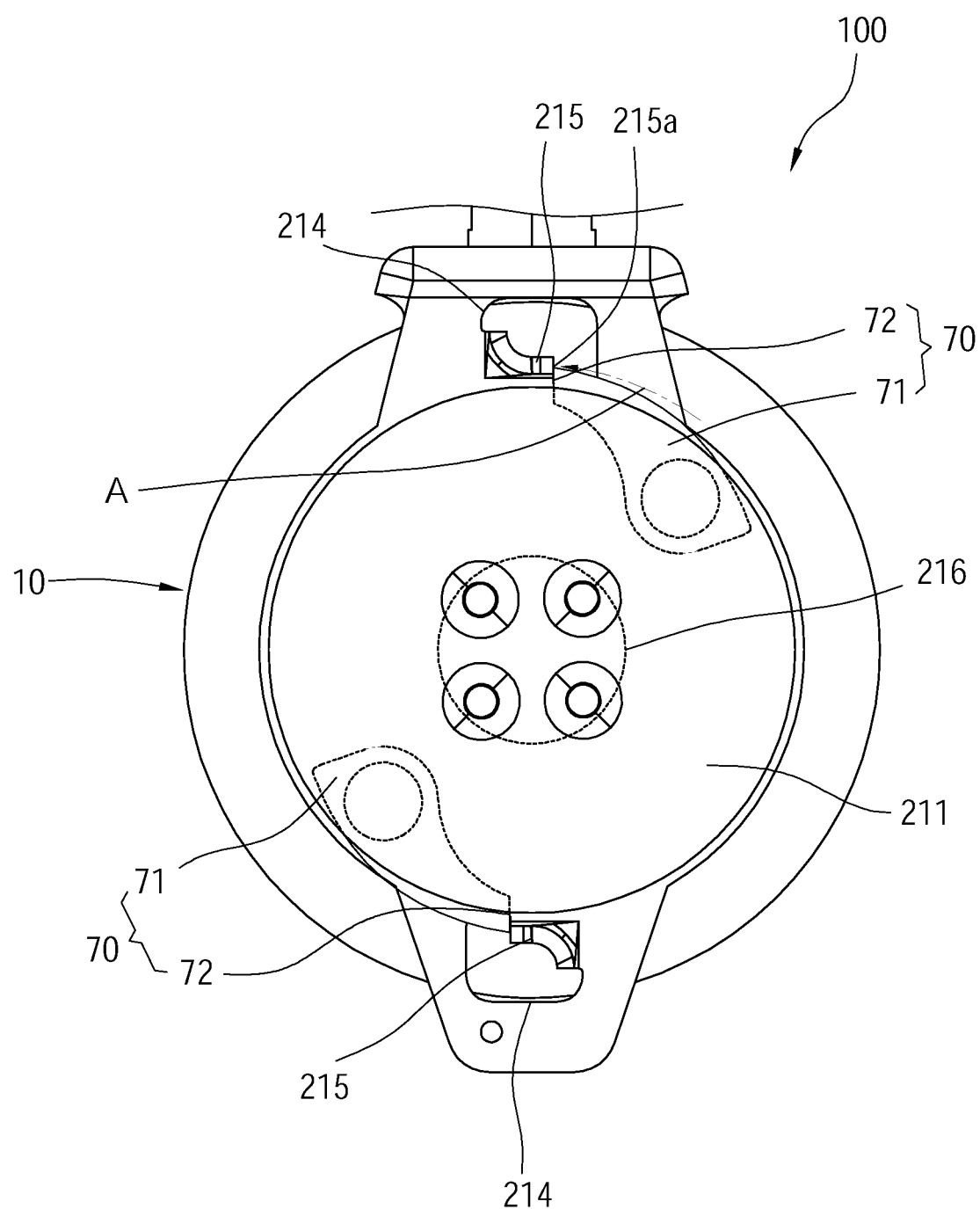
FIG. 5 is a schematic view, showing the braking parts are located at the locking position.

While using the fall protection device 100 of the present invention, the hanging ring 22 of the frame 20 is fixed on a secure support, and the safety belt 40 is fastened to an operator working in elevated workplaces. When the operator carelessly falls from an elevated site, the safety belt 40 would be pulled out for a short length and rotate the rotatable member 30 and the braking plate 60 rapidly, so that the braking parts 70 are spun out to the locking position by a centrifugal force which is generated by the rapidly rotating braking plate 60 and overcomes the elastic force of the restoring spring 80. At this time, the abutting portion 72 of each of the braking parts 70 abuts against one of the stoppers 215 of the frame 20, as shown in FIG. 5, thereby to stop the rotatable member 30 and the braking plate 60 from rotating, preventing the safety belt 40 from being pulled out again and preventing the operator from continuously falling.

The number of the braking parts 70 is the same as the number of the stoppers 215, and the distances between each stopper 215 and the connecting hole 216 are the same, and the angles between any two adjacent stoppers 215 are also the same, and the two stoppers are arranged in the same virtual extension axis i which passes through the center of the connecting hole 216, and when the braking parts 70 are located at the locking position, the distances between the abutting portion 72 of each braking part 70 and the axial center of the driven shaft 62 of the braking plate 60 are the same, and the angles between the abutting portion 72 of any two braking parts 70 are also the same, and the two braking parts 70 are arranged in the same virtual extension axis i which passes through the axial center of the driven shaft 62, so that the abutting portion 72 of each of the braking parts 70 could abut against one of the stoppers 215 at the same time when the braking parts 70 are spun out to the locking position by the centrifugal force generated by the rotating braking plate 60, making a locking effect between the braking parts 70 and the stoppers 215 synchronously. In this way, the fall protection device 100 of the present invention could evenly distribute the force (i.e., the gravity of the falling person) on each of the stoppers 215, and the damage of the stoppers 215 could be reduced, which extends the service life of the fall protection device 100, and the accuracy and maximum load capacity of the lock effect could be greatly enhanced.

However, the number of the stoppers 215 and the number of the braking parts 70 are not limited to be two, but could be three or more than three, as long as the distances between each stopper 215 and the center of the connecting hole 216 are the same. In an embodiment, three or more stoppers 215 are also centered on the center of the connecting hole 216, and the central angles between any two adjacent stoppers 215 are also the same. For instance, when there are three stoppers 215, the central angles between any two adjacent stoppers 215 are 120 degrees, wherein the central angles between the abutting portion 72 of any two adjacent braking parts 70 are determined depending on the central angles between any two adjacent stoppers 215.

In addition, since the stoppers 215 extend in an arc-shape, when each of the stoppers 215 is bumped and is abutted by the corresponding braking part 70, the stress generated by a collision between the stoppers 215 and the braking parts 70 is gradually transmitted through the curved surface and is dissipated to the other end, whereby stress could be prevented from excessive concentration and retention. By connecting each of the stoppers 215 and the two adjacent side walls of one of the holes 214, an engaging strength between each of the stoppers 215 and the frame 20 could be strengthened, whereby to avoid cracking and fracturing. In this way, the stress could be dispersed, and the damage of the components could be reduced, thereby increasing the service life of the fall protection device 100. Since the bending direction of each of the stoppers 215 is opposite to the arc direction A that the corresponding braking part 70 moves, the stress generated by the collision could be further dispersed. In addition, since the height of each of the stoppers 215 relative to the outer surface of the first side plate 211 decreases gradually from the first side end 215a to the second side end 215b, the stoppers 215 are allowed to withstand a large impact force at a portion closed to the first side end 215a, and the force received at a portion gradually away from the first side end 215a is gradually reduced. Therefore, the height reduced structure allows for less material use without compromising strength, which saves material cost.

It must be pointed out that the embodiments described above are only some preferred embodiments of the present invention. All equivalent structures which employ the concepts disclosed in this specification and the appended claims should fall within the scope of the present invention.

What is claimed is:

1. A fall protection device, comprising:
   a frame, wherein a side surface of the frame has a connecting hole located on a center of the frame and a plurality of stoppers which protrude and are located around a periphery of the connecting hole; distances between each stopper and a center of the connecting hole are the same;
   a rotatable member, which is rotatably disposed on the frame;
   a safety belt which winds around an outer peripheral surface of the rotatable member and pulls the rotatable member to rotate;
   a braking plate which has a plate body and a driven shaft protruding from a center of the plate body, wherein the driven shaft passes through the connecting hole of the frame, so that the braking plate is coaxially connected to the rotatable member, whereby the braking plate rotates coaxially along with the rotatable member; and
   a plurality of braking parts, wherein a number of the braking parts is the same as a number of the stoppers; each of the braking parts has a body and an abutting portion which is integrally connected to the body as a monolithic unit; the body of each of the braking parts is pivotally connected to the plate body of the braking plate, so that the braking parts are located around a periphery of the driven shaft;
   wherein when the braking plate rotates, each of the braking parts is driven to pivot from a restoring position to a locking position; when each of the braking parts is located at the locking position, the abutting portion of each of the braking parts is located at a position corresponding to one of the stoppers and abuts against one of the stoppers at the same time, thereby to restrict the rotatable member from rotating;
   wherein each of the stoppers has a first side end and a second side end and extends in an arc shape from the first side end toward the second side end; when the braking parts are located at the locking position, each of the abutting portions abuts against one of the first side ends; a height of each of the stoppers relative to the side surface decreases gradually from the first side end to the second side end.

2. The fall protection device of claim 1, wherein the frame has only two stoppers, and the two stoppers located on a same virtual extension axis passing through the center of the connecting hole.

3. The fall protection device of claim 1, wherein the frame has a frame body and a hanging ring; the frame body has a first side plate, a second side plate, and a top plate, wherein the first side plate is parallel to the second side plate and is spaced from the second side plate by a predetermined distance, and the top plate is connected to both of a top end of the first side plate and a top end of the second side plate; the side surface is located on the first side plate; the stoppers protrudes from the side surface of the first side plate; the hanging ring is rotatably engaged with the top plate and extends out of a top of the housing; the rotatable member is disposed between the first side plate and the second side plate; the frame has only two stoppers, and a vertical plane defined by the center of the connecting hole and a rotation axis of the hanging ring passes through the two stoppers.

4. The fall protection device of claim 1, wherein a plurality of holes are formed on the side surface of the frame; each of the stoppers is connected to two adjacent side walls of one of the holes.

5. The fall protection device of claim 4, wherein each of the holes comprises a first portion and a second portion; the first portion communicates with the second portion; each of the stoppers is connected to two side walls of the first portion of the corresponding hole; each of the second portions is closer to the braking plate than the corresponding first portion.

6. A fall protection device, comprising:
   a frame, wherein a side surface of the frame has a connecting hole located on a center of the frame and a plurality of stoppers which protrude and are located around a periphery of the connecting hole; distances between each stopper and a center of the connecting hole are the same;
   a rotatable member, which is rotatably disposed on the frame;
   a safety belt which winds around an outer peripheral surface of the rotatable member and pulls the rotatable member to rotate;
   a braking plate which has a plate body and a driven shaft protruding from a center of the plate body, wherein the driven shaft passes through the connecting hole of the frame, so that the braking plate is coaxially connected to the rotatable member, whereby the braking plate rotates coaxially along with the rotatable member; and
   a plurality of braking parts, wherein a number of the braking parts is the same as a number of the stoppers; each of the braking parts has a body and an abutting portion which is integrally connected to the body as a monolithic unit; the body of each of the braking parts is pivotally connected to the plate body of the braking plate, so that the braking parts are located around a periphery of the driven shaft;
   wherein when the braking plate rotates, each of the braking parts is driven to pivot from a restoring position to a locking position; when each of the braking parts is located at the locking position, the abutting portion of each of the braking parts is located at a position corresponding to one of the stoppers and abuts against one of the stoppers at the same time, thereby to restrict the rotatable member from rotating;
   wherein each of the stoppers has a first side end and a second side end and extends in an arc shape from the first side end toward the second side end; when the braking parts are located at the locking position, each of the abutting portions abuts against one of the first side ends; a plurality of holes are formed on the side surface of the frame; each of the stoppers is connected to two adjacent side walls of one of the holes.

7. The fall protection device of claim 6, wherein each of the holes comprises a first portion and a second portion; the first portion communicates with the second portion; each of the stoppers is connected to two side walls of the first portion of the corresponding hole; each of the second portions is closer to the braking plate than the corresponding first portion.

8. The fall protection device of claim 6, wherein the frame has only two stoppers, and the two stoppers located on a same virtual extension axis passing through the center of the connecting hole.

9. The fall protection device of claim 6, wherein the frame has a frame body and a hanging ring; the frame body has a first side plate, a second side plate, and a top plate, wherein the first side plate is parallel to the second side plate and is spaced from the second side plate by a predetermined distance, and the top plate is connected to both of a top end of the first side plate and a top end of the second side plate; the side surface is located on the first side plate; the stoppers protrudes from the side surface of the first side plate; the hanging ring is rotatably engaged with the top plate and extends out of a top of the housing; the rotatable member is disposed between the first side plate and the second side plate; the frame has only two stoppers, and a vertical plane defined by the center of the connecting hole and a rotation axis of the hanging ring passes through the two stoppers.

\* \* \* \* \*